US012661827B2

(12) United States Patent
Karau

(10) Patent No.: US 12,661,827 B2
(45) Date of Patent: Jun. 23, 2026

(54) GAPLESS BUFFER FOR MASONRY BLOCK MANUFACTURE

(71) Applicant: PAVESTONE, LLC, Atlanta, GA (US)

(72) Inventor: William H. Karau, Southlake, TX (US)

(73) Assignee: PAVESTONE, LLC, Atlanta, GA (US)

( * ) Notice: Subject to any disclaimer, the term of this patent is extended or adjusted under 35 U.S.C. 154(b) by 1153 days.

(21) Appl. No.: 17/348,231

(22) Filed: Jun. 15, 2021

(65) Prior Publication Data

US 2022/0396006 A1 Dec. 15, 2022

(51) Int. Cl.

| | |
|---|---|
| ***B28B 7/00*** | (2006.01) |
| ***B28B 1/14*** | (2006.01) |
| ***B30B 11/02*** | (2006.01) |
| *E04C 1/00* | (2006.01) |

(52) U.S. Cl.

CPC .............. *B28B 7/0029* (2013.01); *B28B 1/14* (2013.01); *B28B 7/0097* (2013.01); *B30B 11/02* (2013.01); *E04C 1/00* (2013.01)

(58) Field of Classification Search

CPC ...................................................... B28B 3/021

See application file for complete search history.

(56) References Cited

U.S. PATENT DOCUMENTS

| | | | |
|---|---|---|---|
| 8,434,971 | B2 | 5/2013 | Dawson et al. |
| 8,607,522 | B2 | 12/2013 | MacDonald |
| 9,181,714 | B2 | 11/2015 | MacDonald et al. |
| 9,243,404 | B2 | 1/2016 | Studebaker et al. |
| 9,862,915 | B2 | 1/2018 | Stolte et al. |
| 9,957,687 | B2 | 5/2018 | MacDonald |
| 2004/0218985 | A1 | 11/2004 | Klettenberg et al. |
| 2015/0042015 | A1 | 2/2015 | MacDonald et al. |
| 2018/0104853 | A1 | 4/2018 | Scherer |

FOREIGN PATENT DOCUMENTS

| | | | | |
|---|---|---|---|---|
| EP | 3000571 B1 * | 1/2019 | ............ | B28B 3/021 |
| KR | 1664724 B1 * | 10/2016 | ............ | B28B 1/045 |
| WO | WO-2011127928 A1 * | 10/2011 | ............ | B28B 3/021 |

* cited by examiner

*Primary Examiner* — Virak Nguon

(74) *Attorney, Agent, or Firm* — Jackson Walker LLP; Christopher J. Rourk

(57) ABSTRACT

An apparatus for manufacturing masonry blocks, comprising a shoe, a backup plate, a plurality of buffers disposed between the shoe and the backup plate, a plurality of snubbers disposed between the shoe and the backup plate and wherein a relaxed height of the plurality of buffers is equal to or less than a height of the plurality of snubbers.

20 Claims, 3 Drawing Sheets

100

GAPLESS BUFFER FOR MASONRY BLOCK MANUFACTURE

TECHNICAL FIELD

The present disclosure relates generally to masonry block manufacturing, and more specifically to a gapless buffer for manufacturing masonry blocks that eliminates undesirable dimensional variations and cracks in the blocks.

BACKGROUND OF THE INVENTION

Masonry blocks can be manufactured in molds that are filled with dry cast masonry mix, and which are then tamped with a shoe. However, the mounting of such shoes may create blocks that have undesired dimensional variations that create uneven pallet stacks and other undesired characteristics.

SUMMARY OF THE INVENTION

An apparatus for manufacturing masonry blocks is disclosed that includes a shoe, a backup plate and a plurality of buffers disposed between the shoe and the backup plate. A plurality of snubbers are also disposed between the shoe and the backup plate, and a relaxed height of the plurality of buffers is equal to or less than a height of the plurality of snubbers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
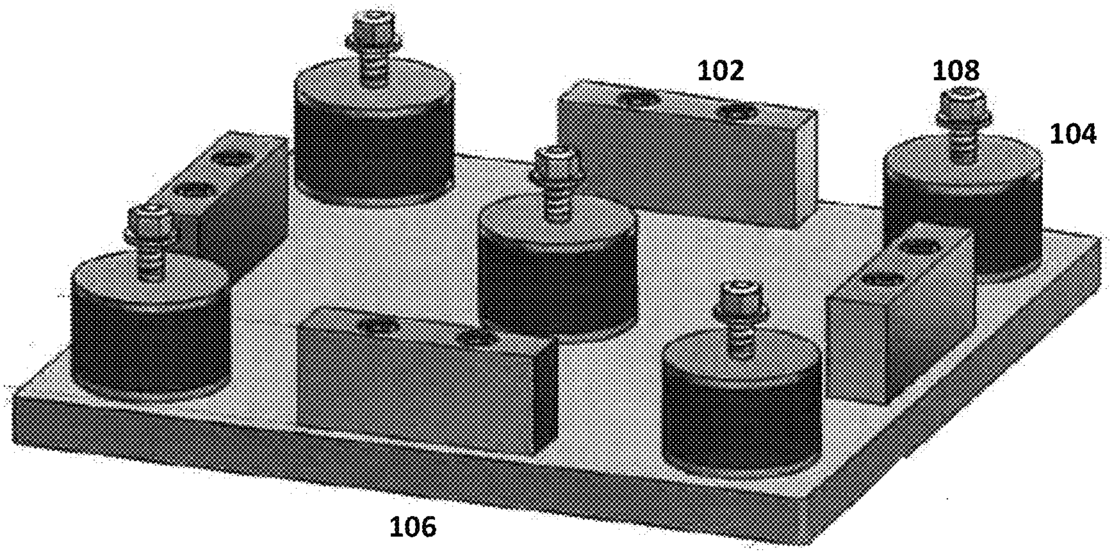
FIG. 1 is a diagram of a masonry block mold shoe assembly, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

FIG. 1 is a diagram of a masonry block mold shoe assembly 100, in accordance with an example embodiment of the present disclosure. Masonry block mold shoe assembly 100 includes a plurality of snubbers 102 and buffers 104 that are disposed on shoe 106. Bolts 108 are used to attach buffers 104 to a backup plate, which is not shown in FIG. 1. Snubbers 102 and shoe 106 can be fabricated from steel, carbon steel, alloy steel, low alloy steel or other suitable materials. Buffers 104 can be fabricated from epoxy, composites, rubber, plastic, polymers, elastomers or other suitable materials. Snubbers 102 can be positioned around the periphery of shoe 106, can include an offset or other suitable configurations can also or alternatively be used. The relaxed height of snubbers 102 and buffers 104 can be identical, so as to avoid the creation of a gap between the backup plate and the snubbers 102. In this manner, shoe 106 is prevented from upward displacement so as to provide a uniform block height, but may be elastically displaced downward and laterally so as to prevent the formation of spider cracks that would otherwise be formed with bi-directionally rigid shoe support. In an alternative embodiment, the height of one or more snubber 102 can be greater than the relaxed height of one or more buffer 104, to pretension the buffer 104, so as to eliminate spider cracks or other manufacturing issues.

Figure 2:
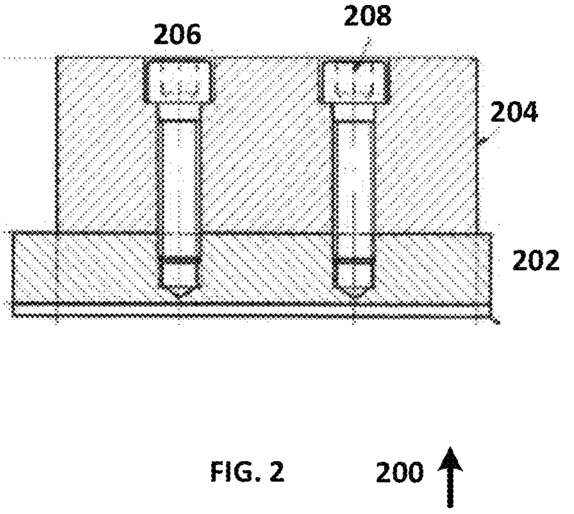
FIG. 2 is a diagram of an example snubber for a masonry block mold shoe assembly, in accordance with an example embodiment of the present disclosure.

FIG. 2 is a diagram of a snubber 200 for a masonry block mold shoe assembly, in accordance with an example embodiment of the present disclosure. Snubber 200 includes shoe 202, snubber 204 and bolts 206 and 208, which are used to secure snubber 204 to shoe 202. Shoe 202, snubber 204 and bolts 206 and 208 can be formed from the same material, such as steel or carbon steel, can be formed from different materials or can be formed from a mixture of materials, such as where snubber 204 is made from steel, base 202 is made from carbon steel, bolts 206 and 208 are made from alloy steel, or other suitable combinations.

Figure 3:
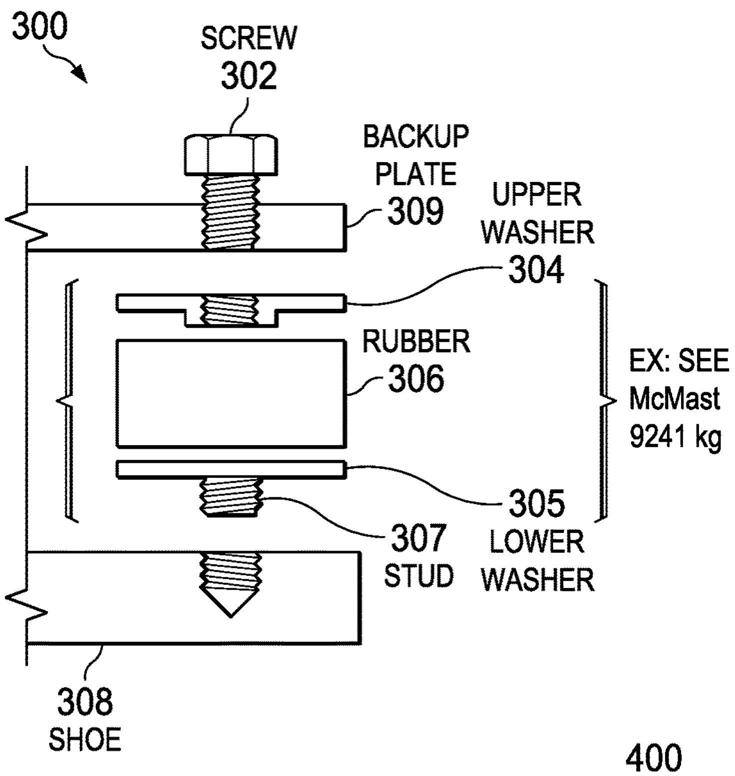
FIG. 3 is a diagram of an example buffer for a masonry block mold shoe, in accordance with an example embodiment of the present disclosure.

FIG. 3 is a diagram of a buffer 300 for a masonry block mold shoe, in accordance with an example embodiment of the present disclosure. Buffer 300 includes buffer material 306, upper washer 304, lower washer 305, stud 307 and bolt 302, which is used to secure shoe 308 to backup plate 309. Shoe 308, washers 304 and 305, bolt 302 and stud 307 can be formed from steel, carbon steel or other suitable materials. Buffer material 306 can be plastic, rubber, elastomer, polymer, a mixture of materials or other suitable materials. The height of buffer material 306, washer 304 and washer 305 can be equal to the height of the snubbers, but alternatively, the buffer material can have a lesser height and can be pre-tensioned to have the same height as the snubbers, or other suitable configurations can also or alternatively be used.

Figure 4:
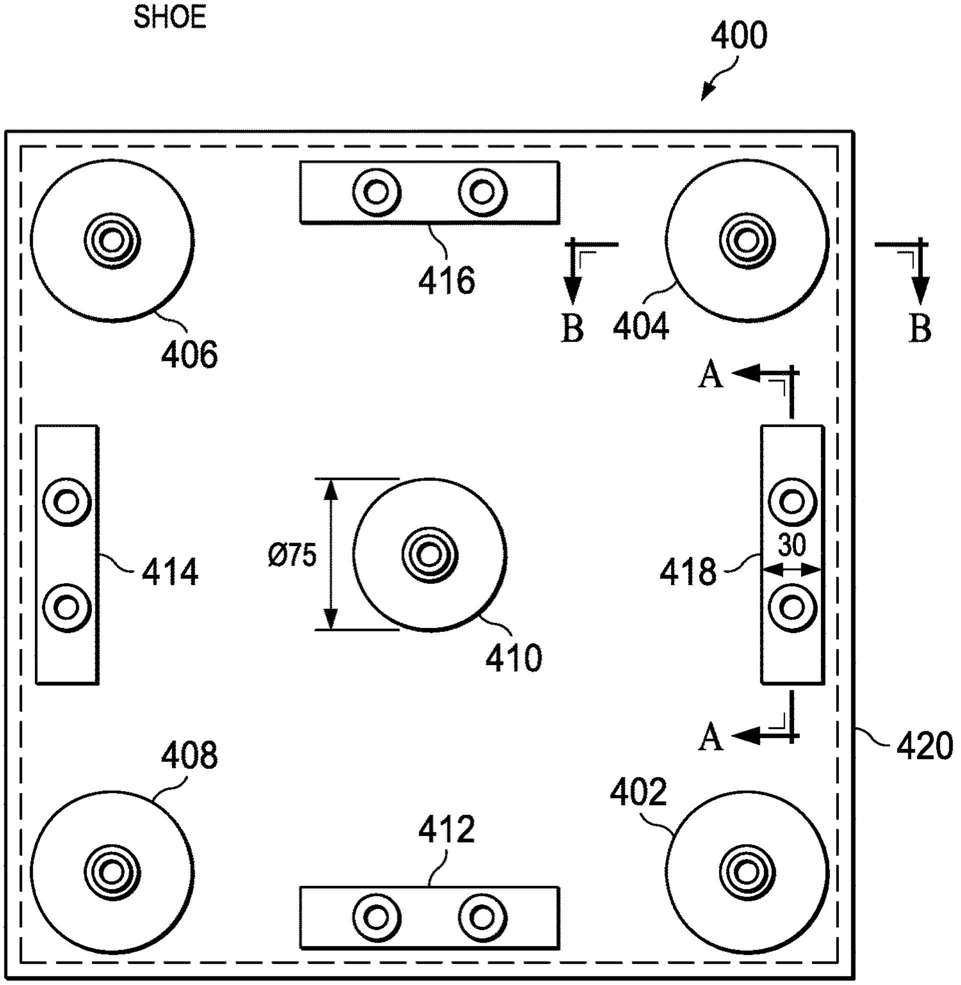
FIG. 4 is a layout diagram of a masonry block mold shoe assembly, in accordance with an example embodiment of the present disclosure.

FIG. 4 is a layout diagram of a masonry block mold shoe 400, in accordance with an example embodiment of the present disclosure. Masonry block mold shoe 400 includes a rectangular periphery, around which are disposed snubbers 412, 414, 416 and 418 at equally spaced intervals in the center of each side of base 420. Buffers 402, 404, 406 and 408 are disposed at the corners of base 420, and buffer 410 is disposed in the center of base 420. In this manner, the snubbers provide support for uniform block height while the buffers provide sufficient flexibility to prevent the formation of spider cracks. Variations on the locations of the snubbers and buffers can also or alternatively be used, such as to offset the snubbers along the periphery, to offset the snubbers set back from the edge of the base, to offset the locations of the buffers at the corners, to relocate the buffers away from the corner or the center, to provide additional buffers between the center and the corners or in other locations, to randomize the placement of snubbers and buffers to avoid resonance, or other suitable variations.

Figure 5:
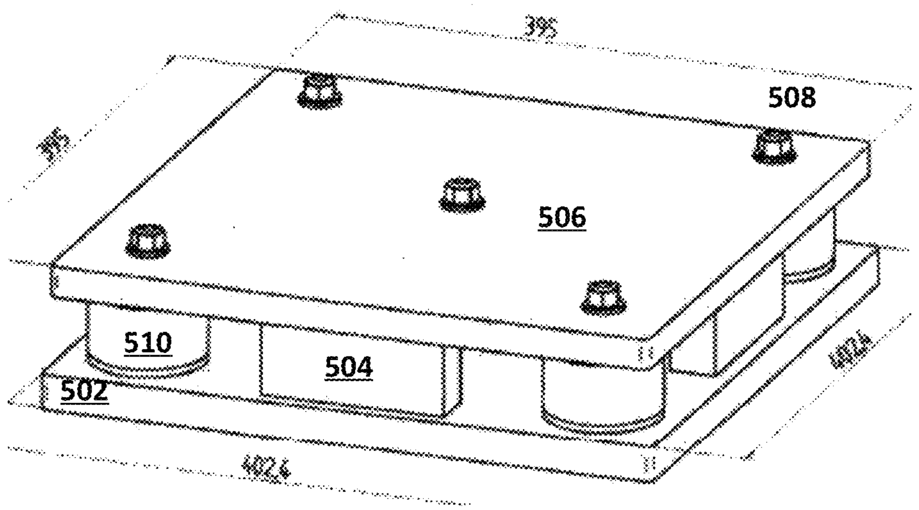
FIG. 5 is a diagram of a masonry block mold shoe, in accordance with an example embodiment of the present disclosure.

FIG. 5 is a diagram of a masonry block mold shoe assembly 500, in accordance with an example embodiment of the present disclosure. Masonry block mold shoe assembly 500 includes shoe 502, snubbers 504, buffers 510 and backup plate 506, which are secured by bolts 508. A uniform height between base 502 and support 506 is provided by snubbers 504, while buffers 510 provide sufficient flexibility in the locations disclosed herein to avoid the creation of spider cracks.

Figure 6:
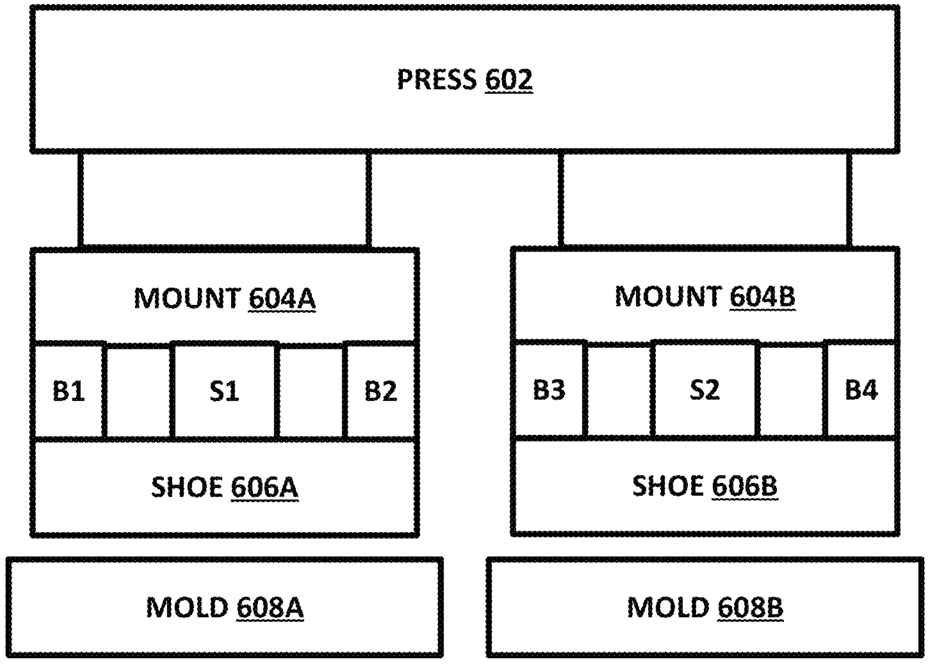
FIG. 6 is a diagram of a masonry block mold and mold shoe with a gapless buffer, in accordance with an example embodiment of the present disclosure.

FIG. 6 is a diagram 600 of a masonry block mold and mold shoe with a gapless buffer, in accordance with an example embodiment of the present disclosure. Press 602 can be a hydraulic press, a mechanical press, an electrical press or other suitable presses, and can apply a force to mounts 604A and 604B, which convey the force to shoes 606A and 606B, respectively, through buffers B1/B2 and snubber S1, and through buffers B3/B4 and snubber S2, respectively. Shoes 606A and 606B are held against mold 608A and 608B, respectively, and are maintained at a uniform height to prevent variations in height between blocks formed from molds 608A and 608B. Molds 608A and 608B have a mold bottom, a plurality of mold sides and an open top that allows shoes 606A and 606B, respectively, to be placed in the open top so as to apply a force on masonry mix that has been deposited in the mold. While only two mounts, shoes and molds are shown, and only two buffers and one snubber is shown for each masonry mold shoe, additional components can also or alternatively be provided, as discussed herein.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. An apparatus for manufacturing masonry blocks, comprising:
- a shoe;
- a backup plate;
- a plurality of buffers disposed between and coupled to the shoe and the backup plate;
- a plurality of snubbers coupled to only one of the shoe and the backup plate, separate from the plurality of buffers, disposed between the shoe and the backup plate; and
- wherein a relaxed height of the plurality of buffers is equal to or less than a height of the plurality of snubbers.

2. The apparatus of claim 1 wherein the plurality of buffers are disposed at corners of the shoe and at least one of the plurality of snubbers are disposed between two of the plurality of buffers.

3. The apparatus of claim 1 wherein one or more of the plurality of buffers are disposed at a center of the shoe and the plurality of snubbers are disposed around the one or more of the plurality of buffers at the center of the shoe.

4. The apparatus of claim 1 wherein the plurality of snubbers are disposed around a periphery of the shoe and at least one of the plurality of buffers is disposed between two of the plurality of snubbers.

5. The apparatus of claim 1 wherein the plurality of buffers are disposed at different locations relative to a closest snubber.

6. The apparatus of claim 1 wherein the relaxed height of the plurality of buffers is less than the height of the plurality of snubbers.

7. The apparatus of claim 1 wherein at least one of the plurality of buffers is disposed at at least one corner of the shoe.

8. The apparatus of claim 1 wherein one or more of the plurality of buffers is disposed closer to a center of the shoe than a side of the shoe.

9. The apparatus of claim 1 wherein one or more of the plurality of snubbers is disposed around a periphery of the shoe.

10. An apparatus for manufacturing masonry blocks, comprising:
- a shoe;
- a backup plate;
- a plurality of buffers disposed between the shoe and the backup plate;
- a plurality of snubbers, separate from the plurality of buffers, disposed between the shoe and the backup plate; and
- wherein a relaxed height of at least one the plurality of buffers is equal to a height of the plurality of snubbers, the plurality of buffers are disposed at different locations relative to a closest snubber and the relaxed height of at least one the plurality of buffers is less than the height of the plurality of snubbers.

11. The apparatus of claim 10 wherein the plurality of buffers are disposed at corners of the shoe and at least one of the plurality of snubbers are disposed between two of the plurality of buffers.

12. The apparatus of claim 10 wherein one or more of the plurality of buffers are disposed at a center of the shoe and the plurality of snubbers are disposed around the one or more of the plurality of buffers at the center of the shoe.

13. The apparatus of claim 10 wherein the plurality of snubbers are disposed around a periphery of the shoe and at least one of the plurality of buffers is disposed between two of the plurality of snubbers.

14. The apparatus of claim 10 wherein at least one of the plurality of buffers is disposed at at least one corner of the shoe.

15. The apparatus of claim 10 wherein one or more of the plurality of buffers is disposed closer to a center of the shoe than a side of the shoe.

16. The apparatus of claim 10 wherein one or more of the plurality of snubbers is disposed around a periphery of the shoe.

17. An apparatus for manufacturing masonry blocks, comprising:

a shoe;

a backup plate;

a plurality of buffers disposed between the shoe and the backup plate;

a plurality of snubbers, separate from the plurality of buffers, disposed between the shoe and the backup plate; and wherein a relaxed height of the plurality of buffers is equal to or less than a height of the plurality of snubbers and one or more of the plurality of snubbers is disposed around a periphery of the shoe.

18. The apparatus of claim 17 wherein the plurality of buffers are disposed at corners of the shoe and at least one of the plurality of snubbers are disposed between two of the plurality of buffers.

19. The apparatus of claim 17 wherein one or more of the plurality of buffers are disposed at a center of the shoe and the plurality of snubbers are disposed around the one or more of the plurality of buffers at the center of the shoe.

20. The apparatus of claim 17 wherein the plurality of snubbers are disposed around a periphery of the shoe and at least one of the plurality of buffers is disposed between two of the plurality of snubbers.

* * * * *